(12) United States Patent
Chen et al.

(10) Patent No.: US 6,668,666 B1
(45) Date of Patent: Dec. 30, 2003

(54) SYSTEM FOR DETECTING FORCES EXERTED ONTO A TIRE

(75) Inventors: Ling Chen, Darmstadt (DE); Wolfgang Fey, Niedernhausen (DE); Micha Heinz, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/088,444

(22) PCT Filed: Sep. 14, 2000

(86) PCT No.: PCT/EP00/08990

§ 371 (c)(1), (2), (4) Date: Mar. 15, 2002

(87) PCT Pub. No.: WO01/19655

PCT Pub. Date: Mar. 22, 2001

(30) Foreign Application Priority Data

Sep. 15, 1999 (DE) ............................. 199 44 094
Jan. 14, 2000 (DE) ............................. 100 01 543
Sep. 7, 2000 (DE) ............................. 100 44 288

(51) Int. Cl.$^7$ ............................................. G01L 5/00
(52) U.S. Cl. ................. 73/862.381; 73/146; 152/152.1; 340/445
(58) Field of Search ............................... 73/146, 146.2, 73/146.3, 146.4, 146.5, 862.381; 152/152.1, 151; 340/445, 446, 447

(56) References Cited

U.S. PATENT DOCUMENTS 4,748,573 A * 5/1988 Sarandrea et al. .......... 702/108
5,827,956 A * 10/1998 Beste et al. .................. 73/146
5,889,464 A * 3/1999 Huang ........................ 340/442

FOREIGN PATENT DOCUMENTS

| DE | 35 43 058 | 6/1987 |
| DE | 44 09 708 | 9/1995 |
| DE | 44 34 180 | 3/1996 |
| DE | 44 35 160 | 4/1996 |
| DE | 196 02 243 | 7/1997 |
| EP | 0 626 562 | 11/1994 |

* cited by examiner

Primary Examiner—Edward Lefkowitz
Assistant Examiner—Alandra Ellington
(74) Attorney, Agent, or Firm—Rader, Fishman & Grauer PLLC (57) ABSTRACT

A device with at least two sensors, especially tire sidewall torsion (SWT) sensors for a motor vehicle control system, wherein the sensors are mounted at varying distances from the tire rotational axis on the chassis or wheel suspension in a stationary manner and wherein the sensors interact with at least one encoder mounted on or in the tire wall or with at least one conventional encoder mounted on or in the tire wall and exhibiting poles. The output signals or output information of the sensors are transmitted to the motor vehicle control system after having been evaluated. In order to provide preprocessed or conditioned data records to the signal processing (DSP=digital signal processor), so that the signal processing software needs to carry out fewer calculating operations to correct the errors in the raw data and determine the tire or wheel forces on the basis of the conditioned data, at least one analog and one digital signal conditioning or processing unit is provided between the motor vehicle control system and the sensors.

10 Claims, 9 Drawing Sheets

SYSTEM FOR DETECTING FORCES EXERTED ONTO A TIRE

TECHNICAL FIELD

The present invention generally relates to sensors and more particularly relates to tire sidewall torsion (SWT) sensors for a motor vehicle control system, with such sensors being mounted at varying distances from the tire rotational axis on the chassis or wheel suspension in a stationary manner and with such sensors interacting with at least one encoder mounted on or in the tire wall or with at least one conventional encoder mounted on or in the tire wall and exhibiting poles, wherein the output signals or output information of such sensors are/is transmitted to the motor vehicle control system after having been evaluated.

BACKGROUND OF THE INVENTION

Many methods using tire sensors for detecting the forces and torque acting on the tires are known for controlling the driving performance of a motor vehicle. Tire sensors (SWT sensors) consist of one encoder mounted in or on the tire and at least one sensor (measuring sensor) that is mounted on the wheel suspension in a stationary manner and associated with the encoder. Whereas EP 04 441 09 B1 proposes to monitor the deformation of the range of the tire profile—the tire contact area—, WO 96/10505 proposes to detect the deformation of the sidewall of a tire—the torsion deformation—by measuring a period of time that elapses between the passing of at least two markings arranged on the rotating wheel at a different radius in relation to the rotational axis. A tire sensor which detects a change in phase angle and/or the amplitude between the output signals emitted by the measuring sensors when the tire is deformed due to forces acting on the tire is described in WO 97/44673.

BRIEF SUMMARY OF THE INVENTION

The object of the present invention is to create a device which can provide preprocessed or conditioned data records to the signal processing unit, so that the software of the signal processing unit can correct any errors in the raw data and determine the tire or wheel forces on the basis of the conditioned signal data with less calculating work. Then the signal processing can be arranged upstream or be part of the motor vehicle control system.

This object is solved by a generic device in that at least one analog and one digital signal conditioning and/or processing unit are provided between the motor vehicle control system and the sensors.

According to an advantageous example of an embodiment, the sensors provide at least two—related to a change in phase angle—and one—related to a change in amplitude—evaluatable output signals in the form of essentially sinusoidal alternating current signals to the analog signal conditioning and/or processing.

For the purpose of determining the amplitude, at least one analog-to-digital converter is associated to the analog signal conditioning and/or processing.

Preferably, the device according to the present invention exhibits the following assemblies:

An analog signal conditioning with a transformer which converts the sinusoidal a.c. signal into a voltage;
a filter that suppresses signal interference;
an offset compensation unit that adapts the signal conditioning and processing unit to changes in the signal offset of the sensor;
a trigger circuit that converts the sinusoidal (analog) signal into a rectangular-pulse signal; and
a unit determining the amplitude, which detects the peak value of every half wave. Preferably, the unit determining the amplitude is characterized by
an isolation amplifier which separately amplifies the positive and negative half wave;
an inverter which reverses the negative half wave;
a switch triggered by the signal provided at the output of the trigger circuit, which switches the positive or negative half wave to the input of an amplitude value detector in correct phase sequence;
a register that retains the value of the amplitude; and
a circuit for deleting the register, which is controlled by the digital signal conditioning and processing unit.

According to a further embodiment of the device proposed by the invention, the digital signal conditioning has at least one logic with at least two period counters, and sequence control systems start or stop the counters for any zero crossovers with positive or negative edges of the signals of the first sensor arranged closer to the rotational axis and the counter content effective at the time is stored as a time stamp in the registers for any zero crossovers of the signals of the second sensor arranged further away from the rotational axis.

Preferably, at least one register is associated with the counters, and the content of the period counter is saved in the register for every zero crossover and then it is started again.

The device according to the present invention reduces the quantity of data of several inter-connected analog input signals in an advantageous manner, so that the information obtained can be processed further with few operations in a digital signal processing unit.

In the SWT sensor signal conditioning and processing electronics according to this invention, information is obtained on the basis of the changes in amplitude, period and phase relation of the input signals, and this information is used to calculate the transversal and longitudinal forces acting on the tires.

Moreover, the device comprises means to suppress undesired interference or to detect such interference and then to compensate it arithmetically during the subsequent data processing.

In this way it is possible to use only one signal processing unit, in particular only one DSP (digital signal processor) for processing the data records of all wheels of a motor vehicle.

The device according to this invention advantageously is a functioning real-time signal processing unit for a SWT sensor system.

It reduces the quantity of input data in a meaningful manner and automates. Thus, the load on the subsequent data processing is reduced and, hence, less requirements are posed with respect to the processor (lower software run times, lower pulse frequency, lower costs).

In addition, it allows deterministic further processing of the data that was generated.

The evaluation circuit can be extended and improved when the magnetic coding of the tire is not strictly uniform but exhibits varying periods in certain areas.

These deviations from the "normal" period (or from the 50:50 pulse duty factor) would have to be so large that they can be definitely recognized as additional coding and not deformation.

In this way, the process of saving the pole pattern is made more safe, since the correct position of the tire can be definitely recognized by the characteristic pole pattern. Complicated software processes for pattern recognition would not be needed.

In addition, information on the type of tire (e.g. summer or winter tire) could be coded, and when these are used as additional information by the control software, they could lead to control algorithms that are better adapted.

The use of a DSP for the data processing is only one advantageous example of an embodiment. A microprocessor can be used in the same way.

The data word widths and pulse frequencies used in the figures and description show one possible realization. Future studies have to determine whether these requirements can be reduced while still maintaining sufficient accuracy.

The device according to the invention is an electronic system that, in a suitable manner, evaluates and preconditions the output signals of SWT (sidewall torsion) sensors to determine the transversal and/or longitudinal forces, so that the data obtained therefrom can be used for further processing in a system controlling the driving performance, in particular the driving stability.

The sensors used detect changes in distance and longitudinal deformation in tires or wheels of motor vehicles. They are sensors with a magnetoresistive bridge, which have an amplifier with a current output already arranged downstream in the sensor head. The output signal of these sensors is an alternating current with almost sinusoidal form, whose amplitude changes in relation to the tire distance and whose frequency changes in relation to the wheel speed. A direct current component is superimposed over the alternating current, so that the resulting total current can have only a positive sign (into the sensor).

Two such sensors are arranged on each wheel. Hence, the change in the chronological difference between the zero crossovers of the two sensor signals indicates the longitudinal deformation of the tire.

The encoders associated with the SWT sensors are arranged in or on the tire sidewalls of the wheels, and preferably a magnetizable powder is filled into them. The magnetization of the tire sidewalls consists of 48 pairs of poles N,S that are arranged radially and distributed equally along the circumference. Their assumed origin is in the tire or rotational axis.

Instead of the second SWT sensor, it would also be possible to evaluate the output signal of a conventional wheel speed sensor. Although this type of sensor provides no information about changes in distance, the longitudinal deformation of the tire can be determined as before by measuring the zero crossovers.

In order to be able to apply this sensor in accordance with the present invention, its pole wheel must have the same number of poles as the SWT encoders.

DETAILED DESCRIPTION OF THE PREFERRED EMBODIMENTS

Function groups of the SWT sensor electronics

Figure 1:
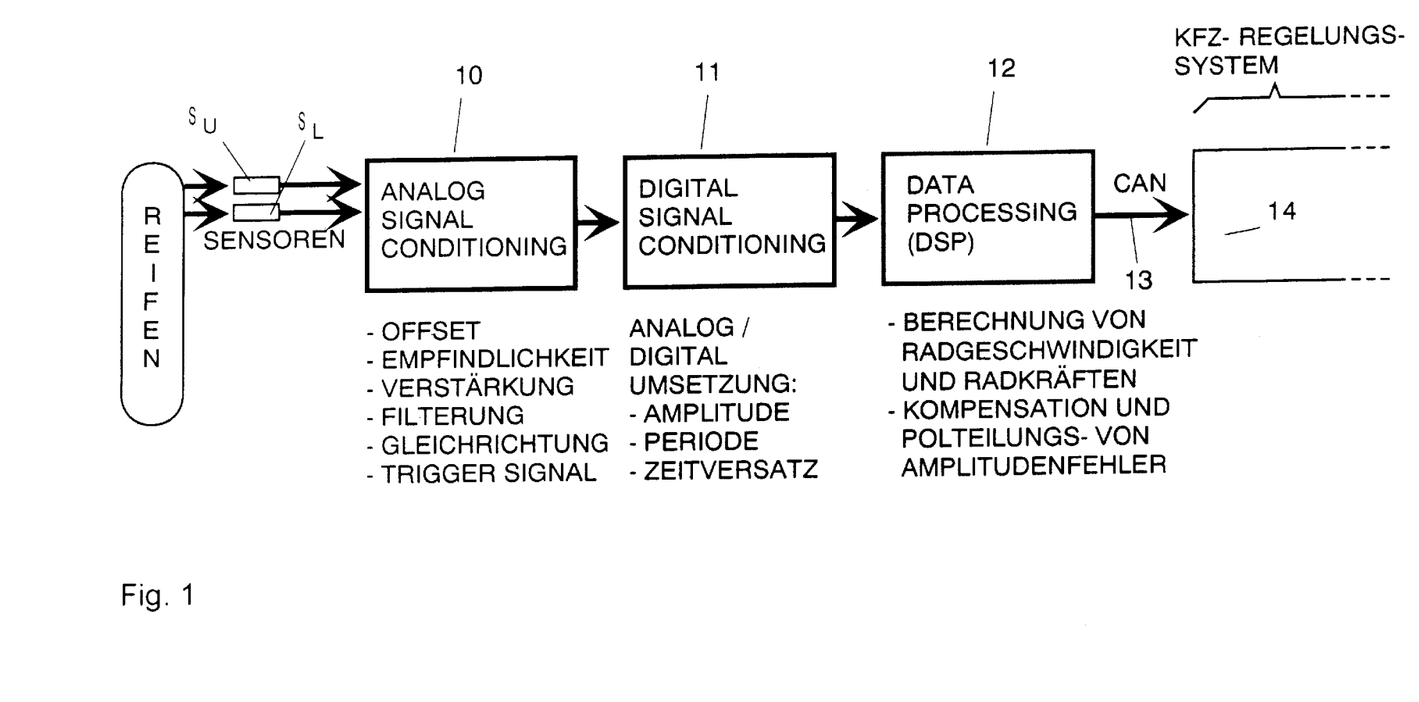
FIG. 1 is a general block diagram of the SWT-signal conditioning and processing unit.
Figure 2:
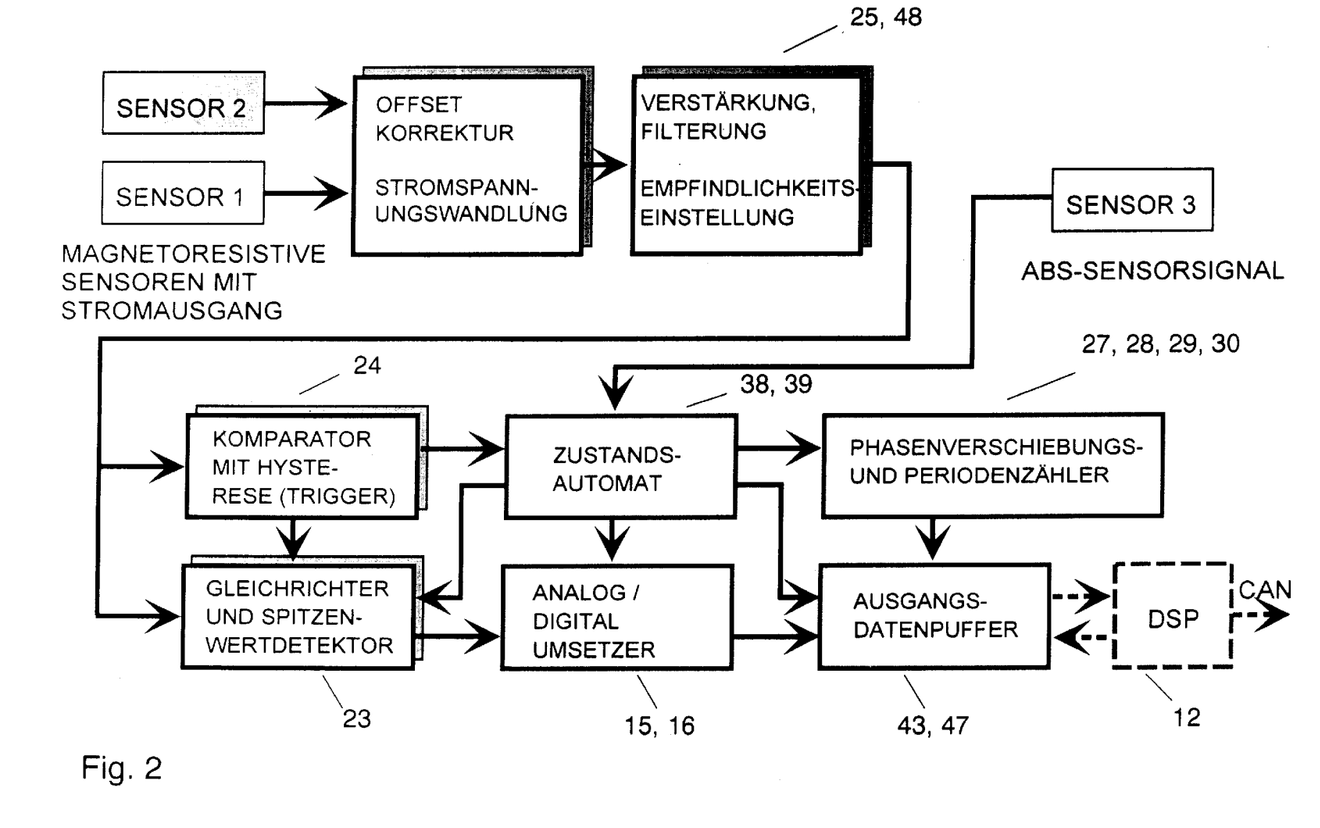
FIG. 2 is a detailed block diagram of FIG. 1.

The circuit shown in FIG. 1 exhibits the following function groups:

Analog signal conditioning 10

Digital signal conditioning 11

Digital signal or data processing 12 (DSP=digital signal processor)

CAN interface 13 providing a connection to the motor vehicle control system 14.

In the analog signal conditioning 10, the sinusoidal output current signals of the SWT sensors $S_L$, $S_U$ are transferred into a voltage and converted to a rectangular signal, filtered, adapted to changes in the signal offset of the sensors, and the peak value of every half wave is detected.

In the digital signal conditioning 11, the analog signals are converted to digital signals or amplitude, period and time delay.

In the digital signal or data processing 12, the wheel speed and wheel forces are determined. In addition, pole center errors and amplitude errors are compensated.

Figure 3:
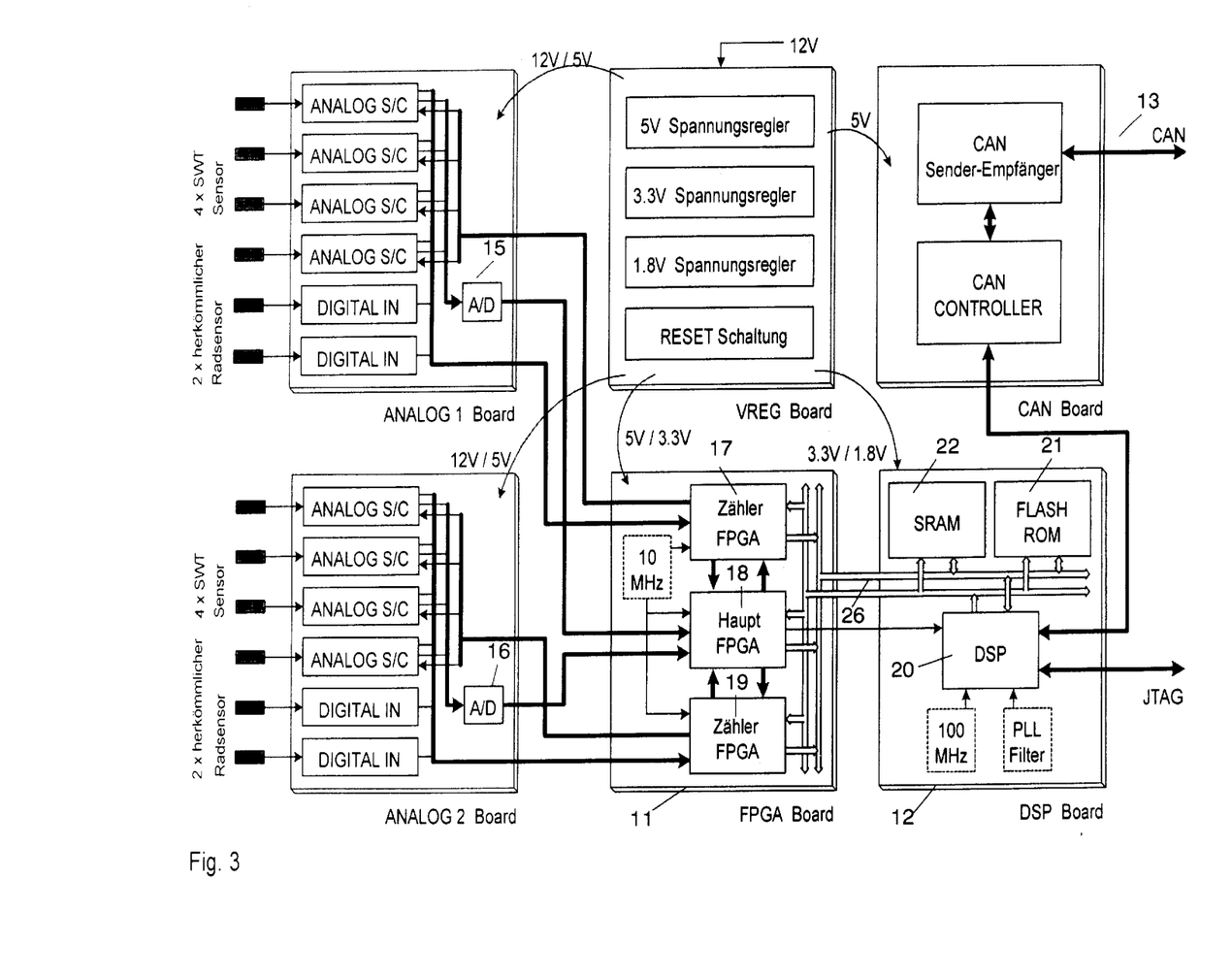
FIG. 3 is a detailed electrical block diagram of the SWT sensor circuit.

FIG. 3 shows the partitioning of the SWT sensor circuit. The complete scope of functions of the circuit is shown in an advantageous example of an embodiment. Each of the eight SWT sensors requires its own analog signal conditioning channel. In addition, the four conventional wheel sensors are connected, so that the SWT sensors also can be operated in the configuration 4× SWT sensors and 4× wheel sensors (instead of 8 SWT sensors).

An analog-to-digital converter 15, 16 is provided for each analog card, which is read out by the main logic 18 (main FPGA=programmable logic block) on the FPGA card.

The division of the digital signal conditioning 11 into three FPGAs 17, 18, 19 is not absolutely necessary. The logic can also be integrated completely in an FPGA.

The FPGAs 17, 19 count the period and the difference between the zero crossovers of the sensors. In addition, the A/D converter 15, 16 is read out to determine the peak value of the signal.

When a new data record is available for a wheel, an interrupt signal is sent to the digital signal processing 12 (DSP), which then picks up the data record via the parallel data interface.

In addition to the signal processor, a Flash ROM 21 for saving the DSP program when it is in an off state and an SPAM 22 for saving data and the program during operation are arranged on the DSP printed circuit board.

All digital components are connected by a joint address and data bus 26.

The force information can be output via the CAN interface 13 or a direct interface to the main processor of the motor vehicle control system 14 (ECU=electronic control unit) or through complete integration.

Description of the data records conditioned for digital signal processing (DSP)

In the following FIGS. 4 to 6, examples of sensor signal curves are used to illustrate which data are determined and transmitted to the digital signal processing 12 (DSP).

First, only the standard SWT configuration with two SWT sensors per wheel will be described.

The sensor mounted closer to the wheel axle is called "lower sensor" ($S_L$), the sensor mounted further towards the outside is called "upper sensor" ($S_U$) in the following.

The signal $S_L$ of the lower sensor is used as "reference signal", i.e. the zero crossovers of this signal are used as the start and stop condition for the period counter 17. Only the period of the lower sensor is determined. There are two period counters 27, 28 or 29, 30 (FIG. 8) (per wheel): one starts and ends with zero crossovers with a positive edge, the other with negative zero crossovers. Since the counting periods overlap chronologically, two separate counters are needed.

In order to determine the chronological shift of the zero crossovers of the two sensor signals, the counter content of the period counter is saved at the instant of time when a zero crossover of the upper sensor signal occurs. This means that a "time stamp" is set for the upper sensor $S_U$ in relation to the period curve of the lower sensor $S_L$. (Then DSP 12 calculates the phase shift of the two signals, which is independent of speed, on the basis of the quotient of period and time stamp.) Furthermore, the maximum amplitude $A_{Lp}$, $A_{Ln}$, $A_{Up}$, $A_{Un}$ of each half wave of both sensor signals is determined.

The sequencing control in the counter FPGAs 17, 19 works as follows:

As soon as a zero crossover of the lower sensor signal is detected, the content of the period counter is saved and the period counter is started again. The time stamps and amplitude values obtained during the current counting period are filed in output registers. (See detailed description of the digital signal processing in Section 4.)

Figure 4:
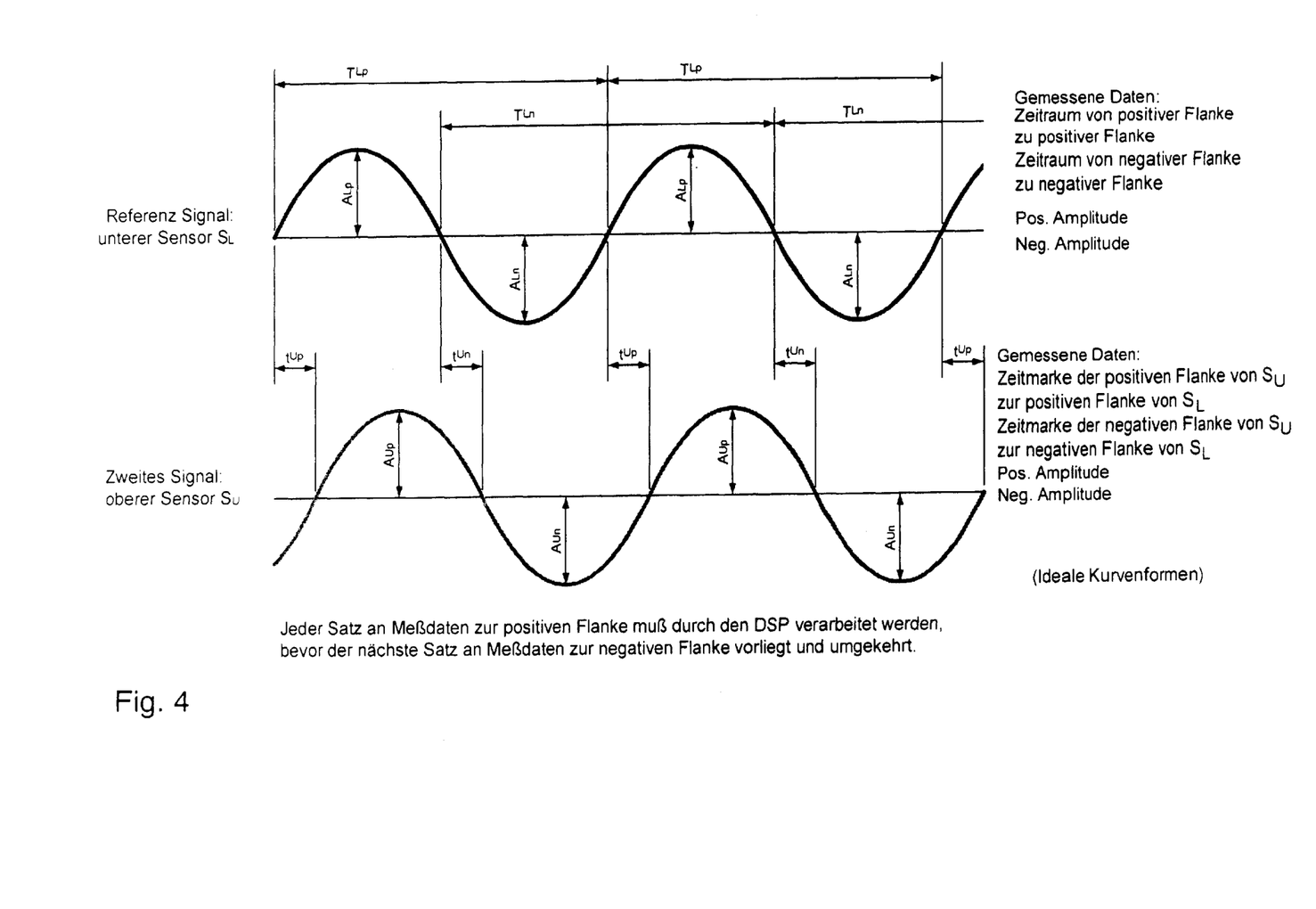
FIGS. 4–6 are examples of sensor signal curves used to illustrate which data are determined and transmitted to the digital signal processor.

FIG. 4 shows the idealized case where only one zero crossover having the same polarity as the upper sensor $S_U$ occurs during every signal period of the lower sensor $S_L$. Thus, the data record available at the end of a counted period with a positive edge consists of the current period $T_{Lp}$ and the amplitude $A_{Ln}$ of the last half wave of the lower sensor $S_L$, the time stamp $t_{Up}$ of the zero crossover of the upper sensor $S_U$ as well as the amplitude $A_{Up}$ of the last half wave before reaching the time stamp.

Figure 5:
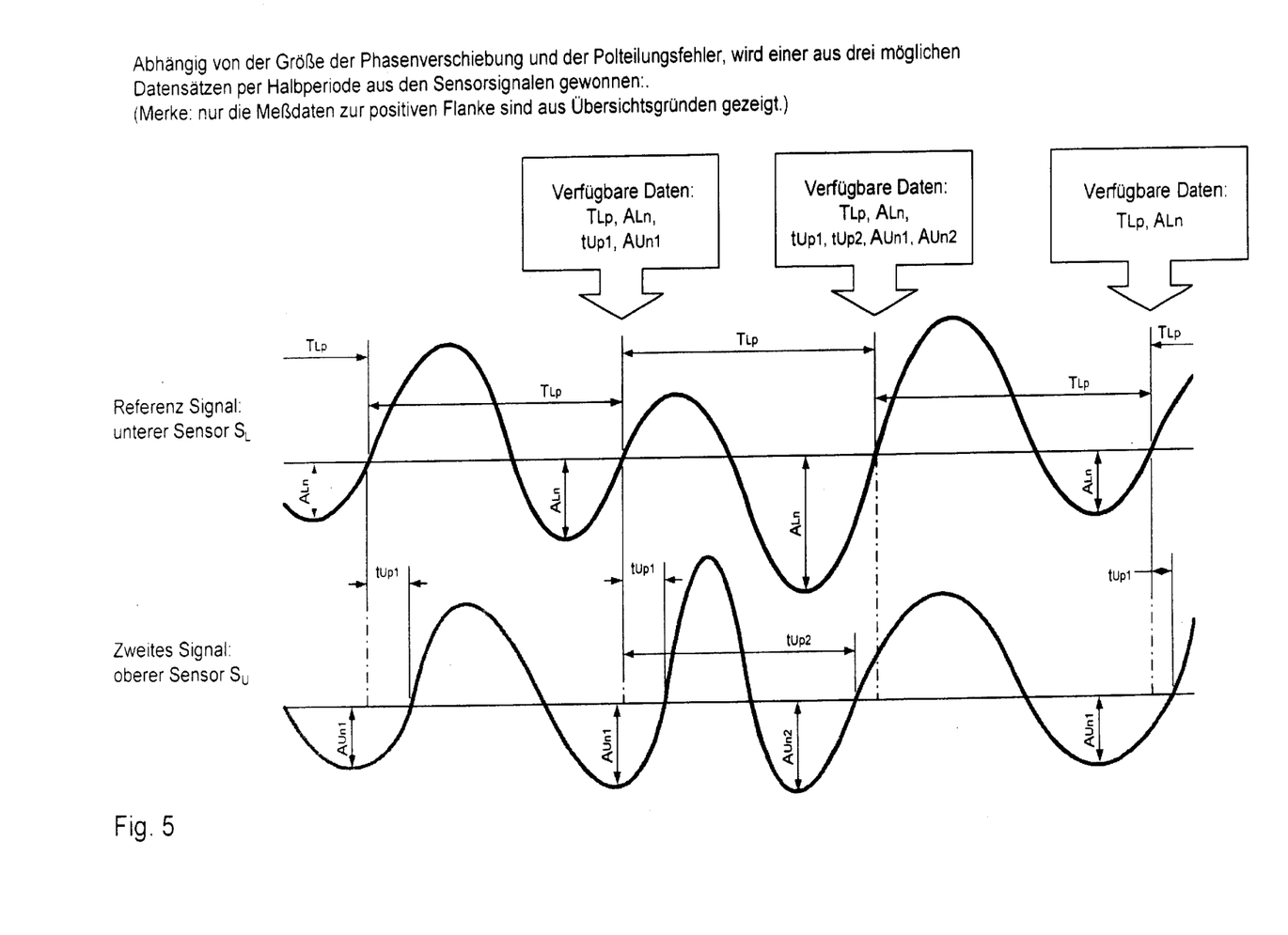

The assignment of the data records is shown in FIG. 5. In this connection, $T_{Lp}$=period, $A_{Ln}$=amplitude of the lower sensor $S_L$, $t_{Up1}$=first time stamp of the upper sensor $S_U$, $A_{Un1}$×amplitude of the lower sensor, $t_{Up2}$=second time stamp. The indices p and n indicate whether the data belong to the positive or negative counter or to the positive or negative amplitude. In addition, it can be seen that the idealized case of constantly having the same data records, as shown in FIG. 4, does not apply in practice: Due to pole centering errors of the encoder, it may be that, during a period of the lower sensor, the signal of the upper sensor has one, two or no zero crossovers with the same polarity as the currently measured period.

These kinds of cases are shown in FIG. 5. It should be noted in this connection that only the data of the measurements from positive to positive edge are shown for reasons of clarity (in reality twice the amount of data occurs).

A large data record may arise if the period of the upper sensor signal is greater than that of the lower sensor signal and the phase shift of the two signals is relatively small.

Since in this case, the time stamp and amplitude actually belonging to the next period are evaluated "prematurely", no data of the upper sensor will arise anymore during the next period under review.

It is the object of the digital signal processing, the DSP, to assign such "premature" data to the appropriate period. As a plausibility check in this connection, the fact that the number of periods of both sensor signals must be constant throughout one rotation of a wheel (given the pole division= 48) is used.

Hence, each data record is associated with the period and exactly one amplitude value for the lower sensor; for the upper sensor it can be no, one or two time stamps and the corresponding number of amplitude values.

If an SWT sensor and a conventional wheel sensor are used, the data record consists of the period of the wheel sensor as well as zero to two time stamps and the corresponding number of amplitude values of the SWT sensor.

The phase shift of the signals in a state preferably free of longitudinal and transversal forces is defined by the arrangement of the sensors in relation to the encoder pattern. The amount of the phase shift can lie between 0 and $2\pi$; the electronic device works with any output values.

Even output values of the phase shift that are greater than a period would be possible, since the signal change caused by deformation of the tire sidewall is less than half of a period due to longitudinal forces arising in connection with the pole pattern chosen here.

A digital signal having the same phase angle and period (trigger signal) generated by the analog signal conditioning 10 (analog electronics) from the sensor signal is used for controlling the A/D converter 15, 16 as well as input signal for the counters 27 to 30.

Figure 6:
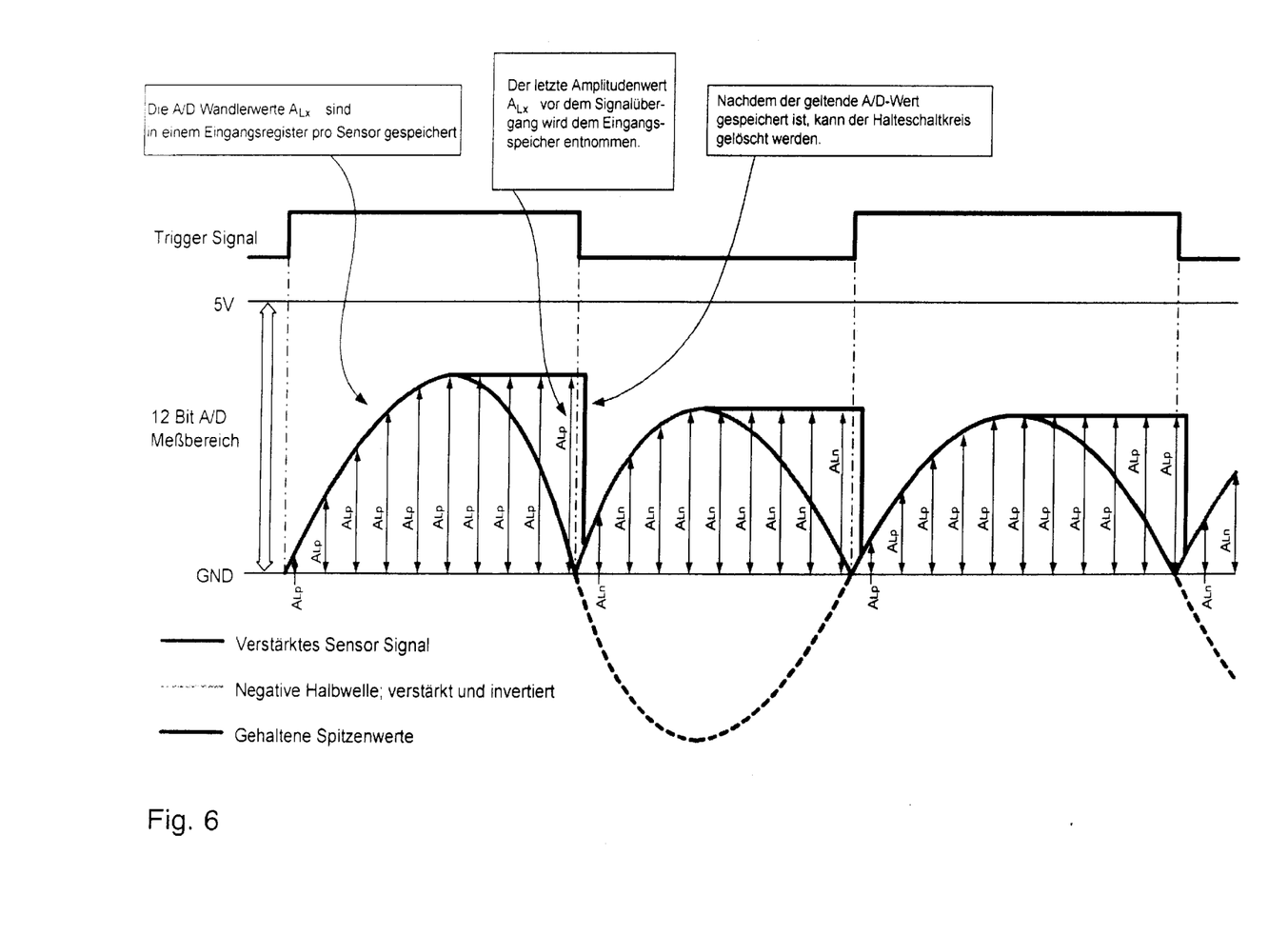

FIG. 6 shows the sequence for determining the maximum amplitude for a sensor channel.

In order to optimally use the resolution of the A/D converter 15, 16, the sensor signal is amplified, rectified and referred to ground.

The A/D converter repeatedly scans the signal behind the hold element 36 and enters the current value in an input register 42 in the main FPGA 18.

When there is an edge change in the trigger signal, the sequencing control in the digital signal conditioning concludes that the maximum amplitude of the signal must have passed now since a current minimum was detected.

However, the maximum value of the past half-period is still saved in the hold circuit 23 and input register 42.

Thus, the last scanned value is moved from the input register 42 to the output register 43, and the hold circuit 36 can be newly initialized to measure the next half-period.

Analog Signal Conditioning

The SWT sensor is connected to 12V and the input of the electronics by means of a two-wire interface. Here, by way of example, the current is converted to voltage via a load resistance after ground (FIG. 7) A. low-pass filter 25 for eliminating signal interference follows downstream.

The analog electronics, for example, operate only with 5V voltage supply; however, other concepts are feasible (pos. and neg. supply).

Figure 7:
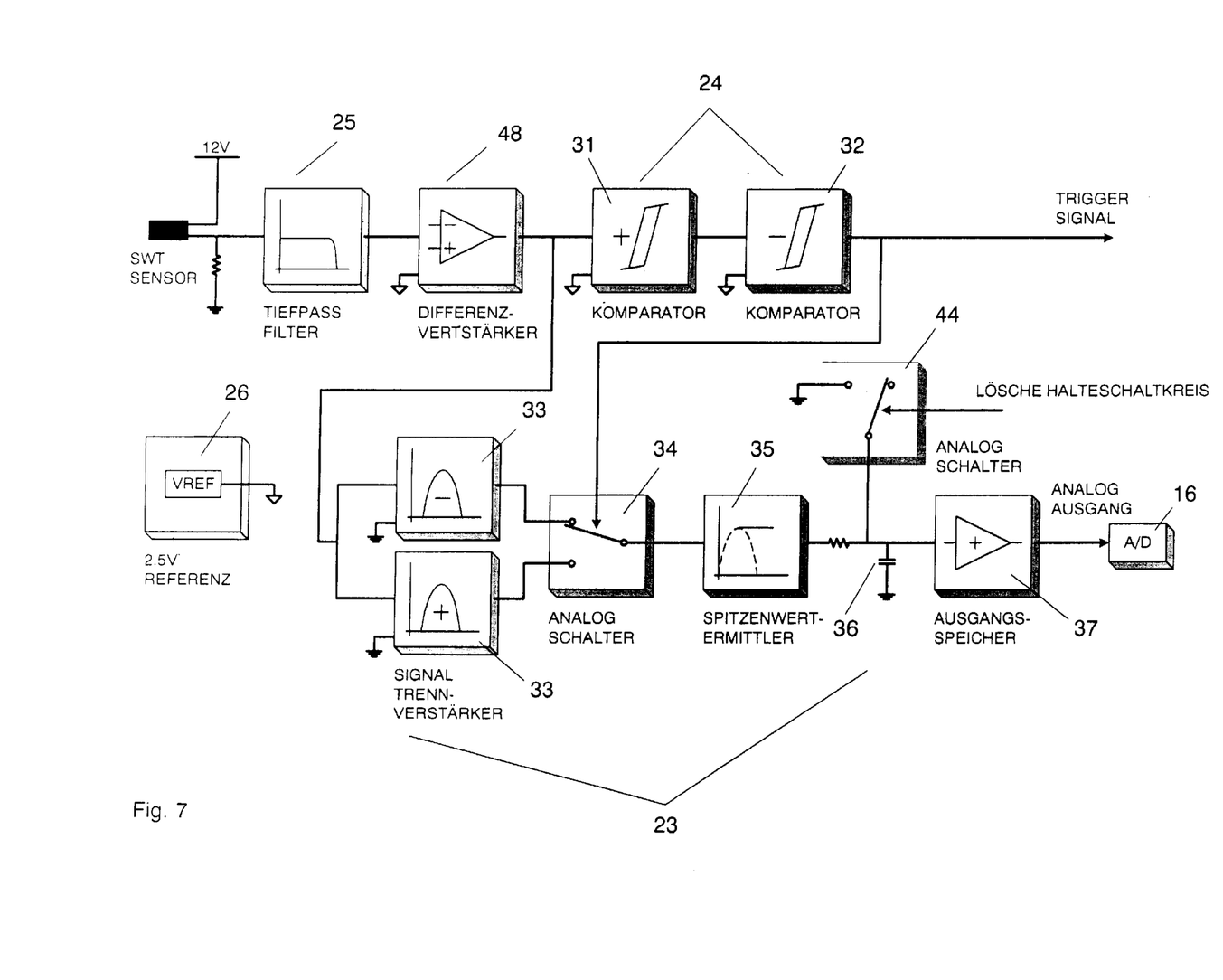
FIG. 7 is an electrical block diagram showing the analog embodiment of the present invention for conditioning the analog signal generated by the SWT sensor.

Before being processed further, the input signal is first related to 2.5V as reference level 26.

According to an advantageous embodiment of the analog signal conditioning, this is achieved by means of an analog continuous zero offset. This may lead to inaccuracies in the signal evaluation if the signal offset of the SWT sensor were to change abruptly. Therefore, another embodiment of the device does not provide continuous offset compensation, but includes a DSP-controlled discrete adaptation of the circuit to varying input offsets. For this purpose, the circuit is designed in such a way that it reacts before the amplified input signal moves out of the value range. Advantageously, this can be achieved by means of a DSP controlled digital to analog converter in the input step.

A comparator 24 generates a rectangular signal with 5V CMOS logic levels from the sinusoidal analog signal, and this is used as the input signal for the digital circuit following downstream.

This comparator needs a defined input hysteresis so that interference and noise do not lead to an erroneous triggering operation. On the other hand the hysteresis must not be too large, so that the zero crossover of slow signals with low amplitudes can still be detected with sufficient precision. The second comparator 32 shown in FIG. 7 is not absolutely necessary; it can be used to generate an in-phase digital signal.

The analog signal conditioning for the amplitude peak-value hold circuit is shown in the lower part of FIG. 7. At first the positive and negative half-waves are separately amplified in a signal isolation amplifier 33 and related to 0V in order to optimally use the resolution of the A/D converter 16. The negative half-wave is inverted in the process.

An analog switch 34 controlled by the trigger signal now switches either the positive or negative half-wave in correct phase relation to the input of the peak-value determining unit 35.

The capacitor 36 connected to its output saves the maximum voltage of the current half-wave. In order to apply as little strain as possible on the capacitor 36, an output buffer 37 is arranged upstream of the A/D converter 16.

When the digital signal conditioning 11 logic has detected the edge change in the trigger signal and, thus, has determined that the peak value of the half-wave must have passed the circuit, the voltage value being held at the capacitor 36 is deleted via a second analog switch 44.

Since the first analog switch also has jumped over in the meantime, the circuit immediately begins with the detection of the next half-wave.

Digital Signal Conditioning

Figure 8:
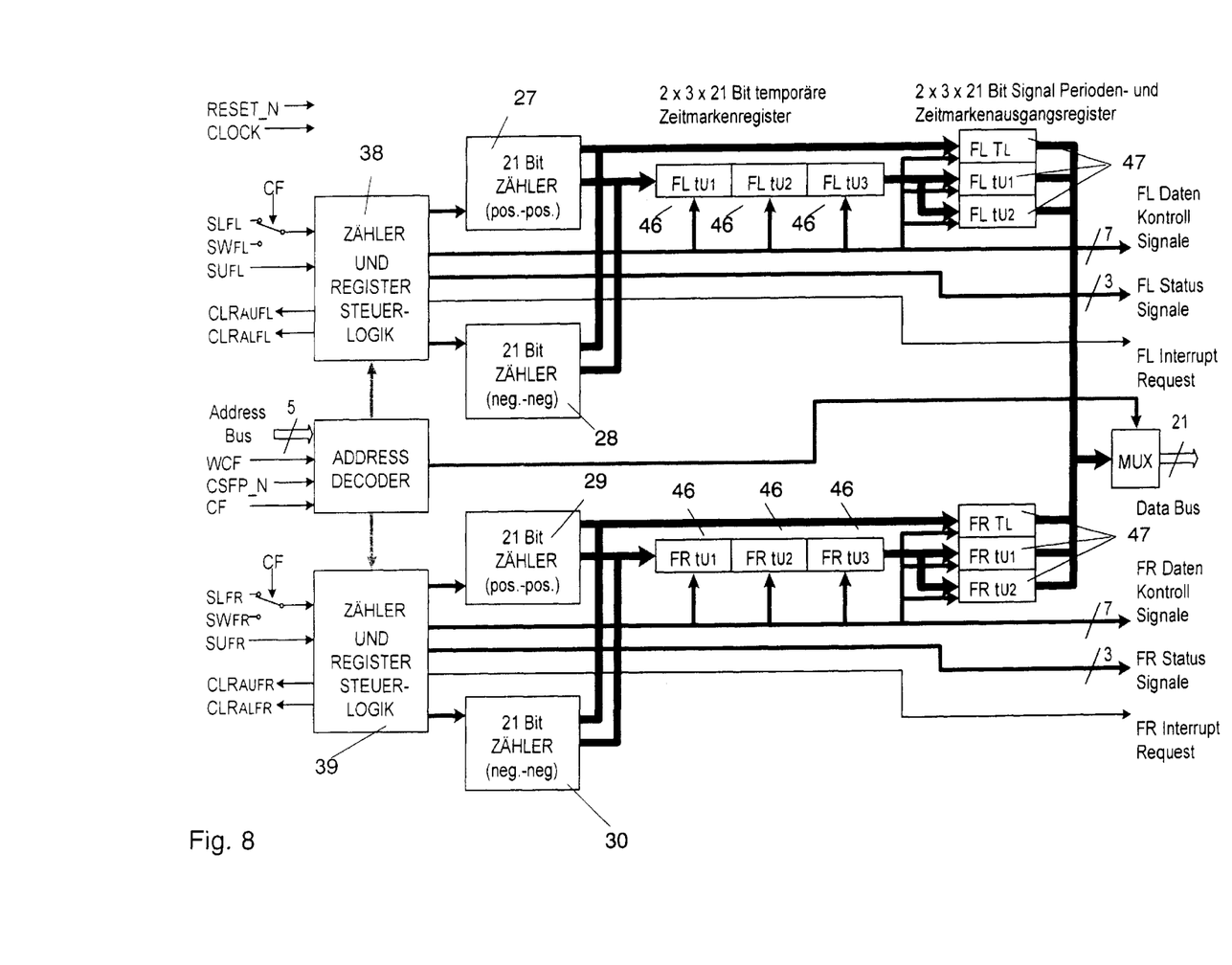
FIG. 8 is a digital block diagram showing the digital embodiment of the present invention for conditioning the digital signal generated by the SWT sensors.

The two FPGAs 17, 19 with the period counters 27 to 30 according to FIG. 8 have identical designs; only the assignment of the input pin WCF defines whether the component is to be applied on the front axle or rear axle of the motor vehicle (different configuration of the addresses).

The circuit requires two input signals for each wheel: either two SWT sensor signals ($S_U$ and $S_L$) or a SWT sensor ($S_U$) and a wheel sensor (SW), whose signal is already supplied in digital form (signal scan in the motor vehicle control system 14).

When two SWT sensors $S_L$, $S_U$ are used, the lower sensor SL is the reference sensor for controlling the period counter, since it can be assumed that the signal scanned closer to the wheel rim is less susceptible to interference than the signal on the outer part of the wheel (natural resonance in the rubber). If, however, a SWT sensor signal is to be omitted in favor of the wheel-bearing sensor, then this has to be the lower SWT sensor, since the signal range achieved would be too low when the upper sensor (on the outer wheel) is omitted. (Only very low displacement of the tire sidewall between the rim flange and SWT sensor located on the inside of the wheel when longitudinal forces prevail.) In this case, the wheel-bearing sensor SW is the reference sensor.

The "counter and register control logic" 38, 39 controls the reset and incrementation of the period counter on the basis of the signal change of the reference signal.

Whenever there is a change in the second input signal, the current counter content is saved in an intermediate register 46. In this respect, it must be distinguished, to which of the two counters the time stamp is associated.

When the second signal change occurs in the reference signal, the phase counter with the corresponding polarity is stopped, its final value ($T_L$) is copied into the output register 47 and the associated time stamps of the other sensor ($t_{U1}$, $t_{U2}$) also are transferred to the output registers. (As already described in connection with FIG. 5, there may be no, one or two time stamps.)

When the data were transferred to the output register, the control logic 38, 39 deletes the hold element 35, 36 of the corresponding sensor channel by setting the signal CLR. An "interrupt request" is sent to the main FPGA 18 (according to FIG. 9) to indicate that new data are ready for pick-up.

The three temporary registers 46 for the time stamps of the second sensor are needed for the following reasons: For one, the output registers cannot be picked up immediately by the DSP and, thus, a time stamp occurring very early on in the next period would be lost if it couldn't be stored temporarily.

For another, both counters 27, 28 or 29, 30 (positive-positive and negative-negative) store their associated time stamps in the same registers, which means that the contents in the three registers have to be re-stored at certain instances of time.

Naturally, dedicated registers could be provided for each counter; however, this would require an extensive logic due to the large bit width.

In view of the fact that data records of both signal edges use the output registers together, there is a speed condition for the DSP:

Since the wheels of the vehicle move independently of one another, the data records of all four wheels are completely asynchronous; i.e. in the worst case, all four at the same time. However, the data have to be picked up from the output registers after half a period, otherwise they will be overwritten by new data.

Thus, the DSP has to be able to pick up and process the data records of all four wheels within ⅛ of a period, otherwise data could be lost.

In this connection, the desired maximum speed at which the system is to operate sets the upper limit for the permissible calculating time in the DSP.

When there are very low wheel speeds (less than 0.5 km/h), the period counter 27, 28, 29, 30 cannot count the period to the end. Starting from a certain counter value an overflow bit is set and the counter is restarted. An "interrupt request" also is sent.

The status flag TCOF allows a distinction as to whether the interrupt was triggered because of a counter overflow or an actual signal change. If an overflow occurred (or several after one another), the DSP can sum up the times up to the next actual signal change. Hence, the DSP can still unequivocally allocate the new pole patterns to the old values despite the fact that the motor vehicle stood still and started up again.

This is needed for the error correction of the encoder pole pattern.

Three status signals are provided for each wheel:

| | |
|---|---|
| PED (positive edge data): | Allocation of the data: based on measurements from positive to positive or from negative to negative edge. |
| TCOF (T counter overflow): | Overflow of the period counter. |
| EF (error flag): | More than two $S_U$ edges were detected during a half $S_L$ period (error; possible only through faults). |

5. Main Logic (Main FPGA)

Figure 9:
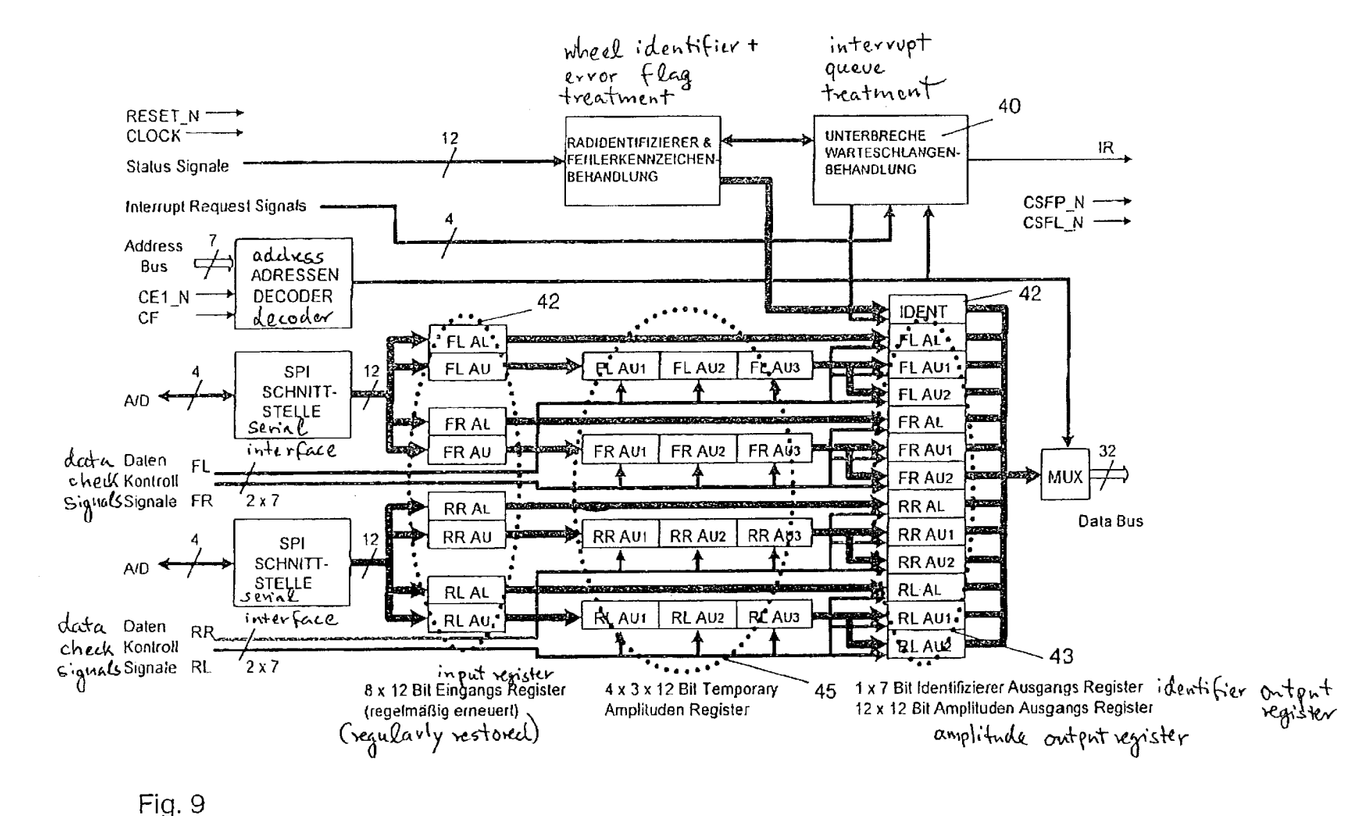
FIG. 9 is an electrical block diagram showing a hardware embodiment of the circuitry responsible for handling interrupt requests and for reading out and saving data from the A/D converters.

FIG. 9 shows that the main FPGA 18 is responsible for handling the "interrupt request" of the counter FPGAs 17, 19 and for reading out and saving the data from the A/D converters 15, 16.

The 2×4 channels of the of the A/D converters are read out continuously one after another and written into the input registers 42. As mentioned in the explanation to FIG. 6, the amplitude value saved last has to be taken over by an output register 43 from the input register 42 whenever there is an edge change in the upper sensor.

This manner of proceeding is possible if data are written into the input register at least once also during ¼ of the minimum permissible signal. period (then it is ensured that the last scanned value definitely follows chronologically after the peak value of the sinusoidal signal).

The control of the A/D converter should be set accordingly.

Since, however, every time stamp of the upper sensor is associated with an amplitude value, these amplitude values have to be saved temporarily in one of three intermediate registers—analogously to the time stamps.

The control signals for the amplitude registers 42, 45, 43 are supplied by the counter FPGAs, since the corresponding administration logic for the time stamps already is available there. When the period of the lower sensor expires, the amplitude values are transferred to the output registers, just like in the counter FPGAs.

The incoming interrupt requests of the counter FPGAs are administered in a wait loop 40. As soon as an interrupt request is received, the interrupt signal IR addressed to the DSP is activated, unless data from the previous interrupt are still being picked up.

If this is the case, the interrupt request is saved until the previous operation is completed. Thus, it is avoided that only one IR signal is emitted when data records of several wheels occur at the same time.

An identification register 41 IDENT, which can be read out by the DSP via the data bus, provides information on the data packages to be picked up and the status of the signal preprocessing.

This register contains the following status signals:

| | |
|---|---|
| WDD (wheel data designator): | Indicates which of the four wheels sent a new data package. |
| WDL (wheel data lost): | A data record from this wheel, which was not picked up, was overwritten by new values (error; should not occur). |
| NDA (no data available): | There are no new data. |
| PED (positive edge data): | Allocation of the data: based on measurements from positive to positive or from negative to negative edge. |
| TCOF (T counter overflow): | Overflow of the period counter. |
| EF (error flag): | More than two $S_U$ edges were detected during a half $S_L$ period (error; possible only through faults). |

6. Sequence of the Data Transfer to the DSP

As soon as the main FPGA sends an interrupt (IR) signal to the DSP 12, the DSP first reads out the identification register 41.

The status signals WDD indicate which of the four wheels is concerned. Then the DSP reads out only the addresses associated with this wheel. (Period (47) and time stamps (47) from the counter FPGAs 17, 19; amplitude values (43) from the main FPGA 18.) When all data have been picked up, the address for the IDENT register is created again in order to confirm that the data transfer was completed.

The interrupt queue handling in the main FPGA recognized the IDENT address and releases the registers that were read for the values that are to be taken over next. (The control signals DSP_EN required for this purpose are not shown in FIGS. 7 to 9 for reasons of clarity.)

If there already is another interrupt in the wait loop, the new values are now allocated to the IDENT register and the next IR signal is sent.

Otherwise the system remains in wait position until a new interrupt request is received from one of the counter FPGAs.

If the WDL bit is set in the IDENT register, this means that a data record of one and the same wheel was lost between the last and the current read-out of such wheel identified by the WDD.

This means that a save position has to be skipped when saving a pole sample of the encoder. An extension of the WDL bit, which would state the correct number of data records even when several data records are lost, is feasible; but it is not realized in the circuit arrangement shown here.

The WDL bit can be set in two different ways, both of which have the same effect towards the outside, however: Either a data record was not transferred to the output registers, because these were just being read and, hence, blocked by DSP_EN, or information already standing in the interrupt wait loop were replaced by subsequent data by overwriting the output registers.

In both cases the original interrupt request of the counter FPGAs does not effect an IR to be sent to DSP. Only the subsequent interrupt request from this wheel will be sent to the DSP again, and then the WDL bit is set in the IDENT register.

If there are no data in a register 43, 47 (e.g. as is usually the case when only one time stamp occurred for SU during the signal period of SL), then '1' is assigned to every bit of the register not being used.

Under normal operating conditions, this register content is not permissible as a numeric value and is considered an error.

Other advantageous embodiments according to the invention propose the following:

Calculating the area of the signal above the zero line as a measurement of the transversal force (scanning the curve form, integration) or forming the average (rectification) of the signal as a measurement of the transversal force.

Furthermore, the device advantageously can provide the following:

Coupling the sensors via step-by-step compensation that is controlled by the DSP, i.e. without automatic compensation of the signal offset, and/or an adjustable amplification that is controlled by the DSP to optimize the amplitude measurement.

What is claimed is:

1. A system for sensing forces exerted onto a vehicle tire, comprising:

at least two sensors, said sensors mounted at varying distances from the tire's rotational axis, wherein said sensors are adapted to interact with at least one encoder associated with the vehicle tire, and to generate output signals, a signal conditioning unit coupled to said sensor output signals, wherein said signal conditioning unit includes at least one analog signal conditioning unit and one digital signal conditioning unit, and a motor vehicle control system coupled to an output of said signal conditioning unit, wherein the at least two sensors include at least one sensor responsive to a change in a phase angle—and include at least one sensor responsive to a change in amplitude.

2. A device as claimed in claim 1, wherein the analog signal conditioning unit includes one analog-to-digital converter.

3. A device as claimed in claim 1, wherein said at least one analog signal conditioning unit includes:
- a converter that transforms a sinusoidal alternating current signal into a voltage,
- a filter that suppresses the signal interference,
- an offset compensation unit that adapts to changes in the signal offset in the output signal in at least one of the at least two sensors,
- a trigger circuit that converts the sinusoidal signal into a rectangular signal, and
- an amplitude determining unit that detects the peak value of every half-wave.

4. A device as claimed in claim 1, further including an amplitude determining unit with an isolation amplifier that separately amplifies the positive and negative half-wave of at least one of said sensor output signals,
- an inverter that reverses the negative half-wave,
- a switch triggered by the signal being applied to the output of the trigger circuit, which switches the positive or negative half-wave to the input of an amplitude value detector in correct phase sequence,
- a register that retains the value of the amplitude, and
- a circuit controlled by the digital signal conditioning or processing for deleting the register.

5. A device as claimed in claim 1, wherein the digital signal conditioning unit includes at least one logic circuit with at least first and second period counters, and wherein said at least two sensors include a first sensor arranged closer to the rotational axis of the tire and a second sensor arranged further away from the rotational axis of the tire, and wherein a sequencing control starts or stops the first and second period.

6. A device as claimed in claim 5, wherein at least one register is associated with the first and second period counters, and wherein the content of the first and second period counter is written into the register whenever a zero crossover occurs in the first or the second period counters.

7. A device as claimed in claim 5, further including interrupt queue handling logic that defines the order in which the data stored in the first and second period counters will be forwarded to the digital signal processing.

8. A device as claimed in claim 1, further including a status register in which status signals are filed.

9. A device as claimed in claim 8, wherein the status register is read by the digital signal conditioning unit following an interrupt request, then a register with the time and a register with an amplitude value are read and a phase shift is determined from these data.

10. A device as claimed in claim 1, wherein a longitudinal or a transversal force experienced by the tire are calculated on the basis of a phase shift, an amplitude or an amplitude change of said sensor output signals from said at least two sensors.

\* \* \* \* \*